Oct. 24, 1950     W. S. SCHAEFER     2,527,336
CONTROL OF PLURAL ARC WELDING
Filed Nov. 3, 1949     2 Sheets-Sheet 2
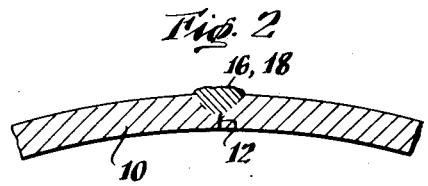
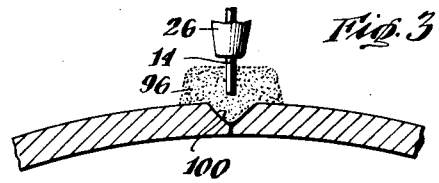
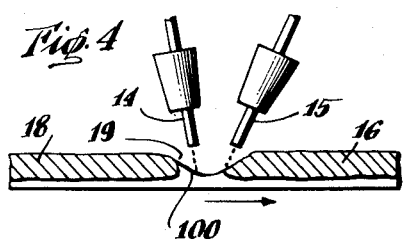
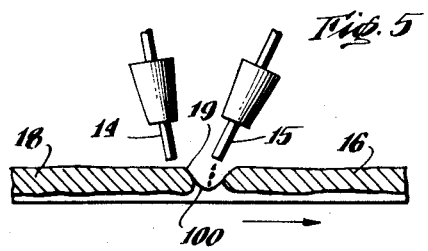
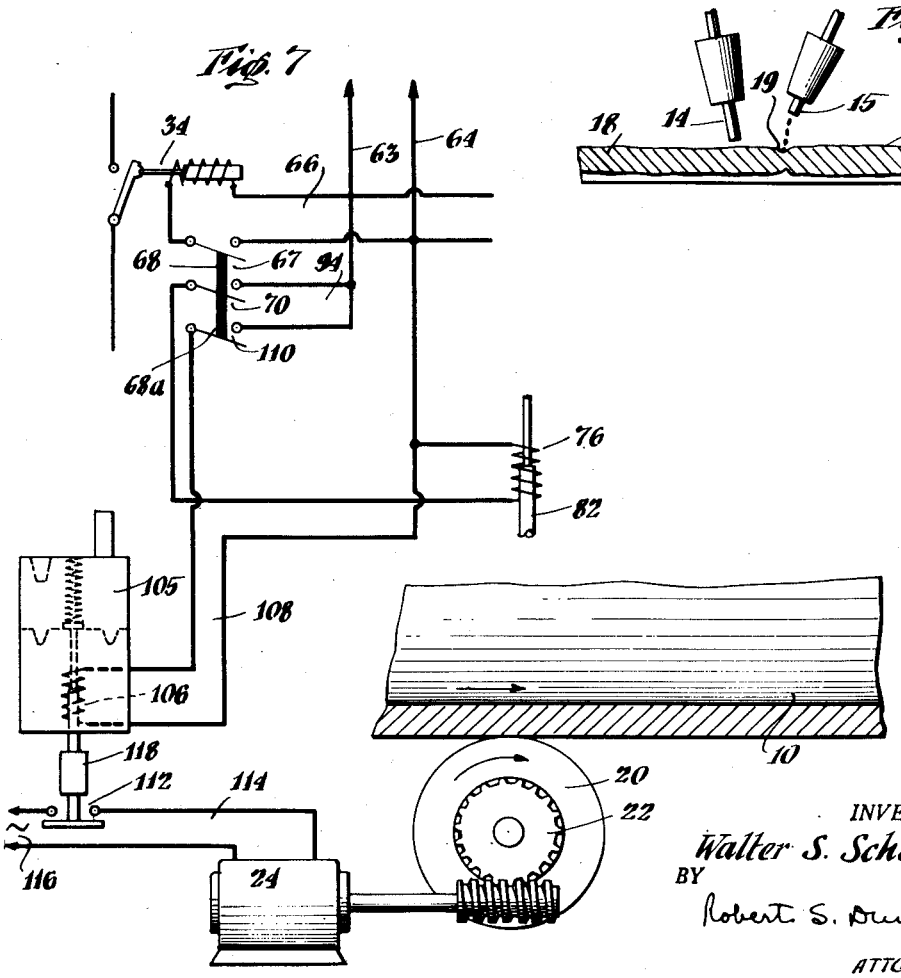
INVENTOR.
Walter S. Schaefer
BY
Robert S. Dunham
ATTORNEY Patented Oct. 24, 1950

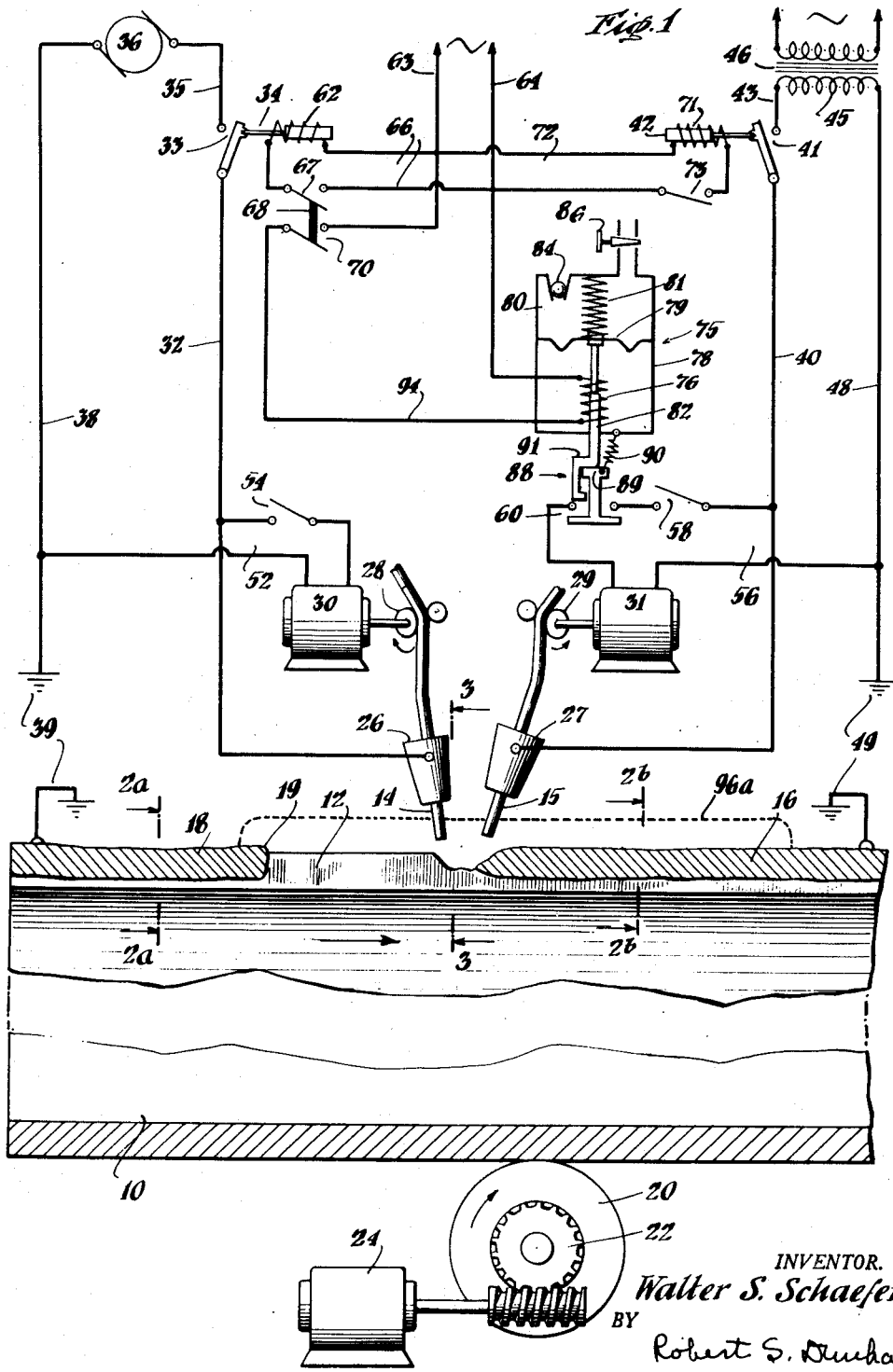

2,527,336

UNITED STATES PATENT OFFICE 2,527,336

CONTROL OF PLURAL ARC WELDING

Walter S. Schaefer, East Gadsden, Ala., assignor to Republic Steel Corporation, Cleveland, Ohio, a corporation of New Jersey Application November 3, 1949, Serial No. 125,192

19 Claims. (Cl. 219—8)

This invention relates to the control of plural arc welding, and more particularly to means and methods for controlling or effecting its interruption, as at the end of a desired weld path. By plural arc welding is meant those operations wherein welding is effected by two or more electrical arcs arranged in series along the weld path, i. e., involving a plurality of arc welding electrodes disposed in an array lengthwise of the locality to be welded, each electrode being generically defined herein as an electrode rod (including rod, wire, strip or like member of welding metal) for which appropriate feeding means is provided to advance it, usually from a supply of such rod, toward the work as its metal is removed by the arc. For current supply to maintain the arc between the electrode rod and the work, an electrical energizing circuit is provided, separate or at least separately controllable for each arc. Welding along the desired path is thus effected by the arcs during suitable relative motion between the electrodes and the work.

Plural arc welding has a number of advantages, including stability and uniformity of operation, and adaptability to the production of large and effectively secured welds on heavy work. There may be two, three or more electrodes, appropriately spaced along the arc path, either to produce, so to speak, separate puddles, or more usually having a spacing of not more than an inch or two so as to function cooperatively in the same puddle of molten metal. The arcs may be supplied with alternating or direct current, either all alike, or with different types of current for different arcs. One commonly employed two electrode system involves one D. C. arc and one A. C. arc, the D. C. arc being usually in the leading position relative to the motion of the work.

While plural arc operations are otherwise satisfactory, difficulty has been encountered when the welding is to be interrupted at the end of the desired path, especially where such interruption occurs at an intermediate locality of the work, i. e., a place where some surface or part extends beyond the prescribed path and must remain untouched by the welding operation that is in progress. Experience has revealed that when the welding is stopped there in a normal way by interrupting the rod feed and the energizing circuits of the arc electrodes, a crater or cavity is left in the work, at the end of the weld. While the actual functioning of plural welding arcs is apparently complex and difficult to ascertain, it is now believed that in their normal operation, particularly with the high current (of several hundred amperes or more) and correspondingly powerful arc as usually preferred for each, the leading arc tends continuously to form a cavity in the weld path, presumably by melting and forcing out the metal of the work. Molten metal thereafter flows into the cavity to fill it just as, or after, the second or last electrode passes the cavity.

That is to say, the welding operation appears to involve the temporary formation of a cavity which travels with the electrodes (so to speak) along the weld path and which is continuously filled with molten metal by the operation of the arcs, to complete the weld progressively with a massive and securely solidified body of metal. In any event, and regardless of theories (upon which the practical success of the invention is in no way dependent), interruption of the plural arc operation ordinarily leaves such a cavity (or cavities) at the weld terminus, e. g., a crater-like depression having a length of the order of an inch or so and extending substantially into and across the work to an extent commensurate with the penetration of weld metal at the perfectly finished portions of the joint.

Where a weld is to reach an end edge of the work such difficulty can be obviated by running the weld into a temporarily attached tab or like member; nor does the difficulty arise where welding progresses continuously along a series of endwise abutted workpieces, but the problem occurs whenever the weld must be stopped short of an edge of the work, for example when the weld is to meet or join the end of a previously made weld, or when a cleft to be closed or a joint to receive a fillet terminates at some central locality of the work. The crater left at the end of such weld path can then only be filled by an entirely separate and uneconomical repair operation.

Accordingly a principal object of the invention is to provide new and improved means and methods for the control of plural arc welding, to permit interruption of such operations without leaving a crater, or other malformation, at the end of the weld. A further object is to afford novel procedure for arresting a plural arc welding operation, e. g., at an intermediate locality of the work, so as to leave a welded seam or the like which is throughout properly filled with solid metal, securely bonded to the work.

Another object is to provide improved control instrumentalities for welding apparatus of the plural arc type, which may operate automatically in response to a simple controlling operation, to stop the arcs without producing a cavity in the work. Other objects are to afford improved apparatus of the character last stated which is of a simple, electrical character, cooperating effectively with conventional types of plural arc welding equipment. A still further object is to provide such apparatus for interrupting operation of plural arc welding means wherein instrumentalities are included which, to further the above-mentioned purposes, may exert cooperating control of the driving means whereby mutual movement is effected between the work and the arc electrodes.

To these and other ends, it has now been found that a plural arc system may be effectively interrupted by a sequence of steps such as the following. When the leading arc of the series reaches the end of the weld path, its energizing circuit is opened and its rod feed is arrested; it is thus simply put out of operation, while the relative motion between the work and the electrodes, in the direction of the weld path, is allowed to continue. Then after a time of delay during which the next or second electrode advances, so to speak, to the locality of the work which was occupied by the first electrode when its operation was interrupted, the rod feed of the second arc is arrested, while its electrical energization, i. e., its arc current supply, is maintained. The arc of the second electrode therefore continues to burn and to effect deposition of metal at the weld locality, until the increasing elongation of the arc discharge (occurring in the absence of rod feed) causes it to extinguish itself. It is found that this procedure not only terminates the welding operation but does so in such a manner that no cavity or crater is left in the work at the end of the weld path, i. e., where such terminus is at a locality spaced from the edge of the workpiece or pieces. The finished weld is thus properly filled with a secure and substantial bead of metal to the very end of the path of operation, viz. the unwelded part of the work. It will be understood that such reference to the unwelded part of the work means the portion not affected by the welding operation which has just been in progress, even though such part may itself have been the subject of a previous welding operation.

While the procedure has been described above for apparatus involving only two electrodes, it is equally applicable to apparatus having three or more electrodes arranged along the work. In such case, for example, the operations described above may be correspondingly performed for the first and second electrodes (just as if they were the only two), and each subsequent electrode may be treated in similar fashion to the second, e. g. by interrupting its rod feed at the proper time and letting its arc burn out by elongation while the terminal cavity or locality of the desired weld path passes under it. Assuming that the relative motion of the work and the set of electrodes continues, the arcs are extinguished at successive intervals timed so that each arc after the first tends to fill up such cavity as may then remain from the arc or arcs preceding it. Preferably each arc after the first is discontinued by interrupting its rod feed and letting it be extinguished by elongation while the work travels by. As a matter of practical operation with three or more electrodes, the successive intervals of interrupting the rod feeds may all be timed from the deenergization of the first arc or each operation after the second may be controlled by the one immediately preceding, i. e. to provide the desired periods of delay.

One modification of the process, for example, comprises treating all the arcs alike (at successive intervals), so that each and every arc, including the first, has its rod feed stopped at an appropriate time, and thereafter extinguishes itself in the manner described above. On the other hand, a fairly good interruption of plural arc welding, without leaving an objectionably large crater, may be obtained, for instance, by first opening the current supply circuit of the first arc and then deenergizing the second arc (by simply opening its arc current circuit) just as it reaches the edge of or passes beyond the edge of the crater left by the first arc.

As thus indicated or as otherwise apparent, the invention is applicable both in its procedure and apparatus, to a variety of circumstances and arrangements of electrodes and to plural arc systems energized by A. C., D. C. or combinations of such types of current. The novel procedure and instrumentalities are useful for a wide variety of types of welding jobs, particularly where a continuous weld is to be achieved along a given path up to a desired locality of the work. Thus the invention is useful for welding a seam along the abutting edges of workpieces, i. e., for so-called butt welding, and it is likewise applicable to other arrangements of pieces to be joined, as for example in welding a fillet at the junction of angularity meeting surfaces.

For specific illustration of the invention, the accompanying drawings show certain steps of the procedure and certain presently preferred forms of the improved apparatus, set forth by way of example.

Referring to the drawings:

Fig. 1 is a diagrammatic view, with the welding instrumentalities in simplified form, showing one embodiment of the apparatus as applied to a welding operation in the manufacture of pipe;

Fig. 2 is a transverse (vertical) section of welded pipe taken on either of lines 2a—2a or 2b—2b of Fig. 1;

Fig. 3 is a fragmentary vertical section on line 3—3 of Fig. 1;

Figs. 4, 5 and 6 are fragmentary views of a welding operation as shown in Fig. 1, respectively illustrating successive stages in the procedure of the invention; and Fig. 7 is a diagrammatic view, similar to Fig. 1, but with certain identical parts omitted, to show certain modified or further structure in accordance with the invention.

While the invention is applicable to welding operations of many types and for various purposes, the drawing shows, for example, a double arc system as employed for welding the longitudinal seam of a pipe blank in the course of manufacturing so-called large diameter steel pipe. As will be understood, such pipe can be made by first rolling the heavy sheet or plate stock (called skelp) into cylindrical shape, to produce a pipe blank having a longitudinal cleft where the edges of the steel skelp meet in edgewise abutment. Such blank may have, for instance, a diameter of 24 to 30 inches or so, a length of the order of 30 feet, and a wall thickness of $\frac{3}{16}$ to $\frac{3}{8}$ inch or more. To complete the pipe, the cleft must be welded longitudinally throughout the length of the blank, such welding being preferably effected on both sides of the pipe wall, i. e. first on one side and then on the other. For certain purposes it has been found desirable to produce one of these axial welds (specifically, the second of them) in two steps, for example by welding inward a short distance from one end of the blank and thereafter welding the long remainder of the cleft on the same side by continuous operation progressing from the other end of the blank to the inner terminus of the short or ligament weld. As explained in the copending application of Frederic M. Darner, Ser. No. 124,928, filed November 1, 1949, wherein such procedure is described and claimed, advantages of security and avoidance of welding faults are achieved where the welding operation on the second welded side (which may be either the inner or outer side of the pipe blank wall, but is usually the inner) is thus accomplished in two stages. It will therefore be seen that the arc-arresting procedure of the present invention is of advantage in such operations, for instance in making the longer of the two component welds. Whether such weld over the longer distance is performed before or after the short or ligament weld (which is usually effected with manually-held, single-arc means), it is desirable to terminate such longer weld without leaving a cavity or crater on the surface of the blank.

Thus referring to Fig. 1, a pipe blank 10 of the character described, is shown as subjected to progressive, continuous welding operation along its longitudinal cleft 12 by a pair of welding electrodes 14, 15 arranged in series as shown, for cooperation of their arcs in producing the weld 16. The pipe is moved axially in the direction of the arrow (i. e. from left to right in the figure) so that the welding progresses along the cleft during such continuous, relative movement. By way of illustration, a previously made short weld 18 (say, six to eight inches long) is indicated at the trailing end of the pipe blank, the object of the present operation being to continue the weld 16 up to the end 19 of the weld 18 but no further. While in accordance with the method of the cited application such two-stage procedure is employed for welding on the second side of the pipe wall, i. e., after a complete weld has been produced along the cleft at the opposite surface, the drawings omit, for clarity, any representation of an inside weld. That is to say, the figures here exhibit only two successive outside welding operations 18 and 16, so that the location of the cleft 12 is rendered more apparent. While as also indicated above, present pipe manufacturing procedures make it more convenient to effect a single, continuous weld first on the outer surface of the pipe blank and then to employ the two-stage weld on the inner surface, the principles and results of the instant invention are the same with either location of the two-stage weld, and it is therefore shown, simply for greater convenience of illustration, on the outer surface of the pipe in Fig. 1.

It will be understood that the associated apparatus may include suitable guiding means and driving means (not shown except as noted below) for continuously advancing the pipe blank while holding it in position, so far as necessary, to prevent lateral displacement and to keep the cleft in alignment with the electrodes 14, 15, as well as to keep the cleft edges closed if not already welded on the other side. Simply to represent a driving means, a roller 20 is shown engaging the surface of the pipe blank 10, actuated through suitable gearing 22 by a motor drive unit 24.

The electrodes 14, 15, each constitute a suitable welding rod or wire advanced through the corresponding one of nozzles 26, 27, by appropriate feeding means which are diagrammatically indicated by the drive members 28, 29, respectively actuated by electric motors 30, 31. Thus the steel electrode rods 14, 15, are continuously advanced toward the work as their metal is deposited by the operation of the arcs, the lower ends of the rods being thereby kept at a desired short distance above the cleft 12. By way of example, the rod 14 is illustrated as energized by direct current and the rod 15 by alternating current, i. e., for the maintenance of the desired arcs. Thus the circuit for the rod 14 may extend from the latter through a conductor 32, contacts 33 of a contactor device 34, conductor 35, generator 36 or other source of direct current, and return conductor 38 to ground 39 whereby the circuit is completed through the work. The similar energizing circuit for the electrode rod 15 extends from the nozzle 27 through the conductor 40, contacts 41 of a contactor device 42, conductor 43, the secondary 45 of a supply transformer 46 (which is appropriately fed from a source of alternating current) and then through the return conductor 48 to ground 49 for like completion of the circuit through the work. It will be understood that the instrumentalities described above are shown in very simplified form, omitting conventional equipment such as the inching, reversing, interlocking and other controls usually employed for the arc circuits and for the rod feeding devices indicated at 28—30 and 29—31.

As shown, the D. C. rod feed motor may be energized by a circuit 52 which includes a manual switch 54 and extends to the conductors 32, 38, of the arc current supply circuit. A similar circuit 56 is provided for energization of the A. C. rod feed motor 31 from the conductors 40, 48, of the alternating current arc supply line, such circuit including a like manual switch 58 but also including, in series, control contacts 60 to be operated as described below.

While the arc current circuits may be directly controlled, the electromagnetic contactor devices 40, 42, are employed to facilitate control of the heavy arc currents without necessity for making and breaking current of such magnitude in the control devices now to be described. Thus the winding 62 of the contactor 34 is adapted to be energized (to close the contacts 33) from a suitable source of alternating current such as the lines 63, 64, by a circuit 66 which includes a switch 67. The switch 67 constitutes one half of a double pole single throw switch generally designated by its common operating member or device 68, the other switch portion of this instrumentality being indicated at 70. For similar control of the winding 71 of the A. C. arc contactor 42, a like circuit 72 extends to the A. C. lines 63, 64, and includes another manual switch 73.

The aparatus further embodies a time delay relay generally designated 75 which includes the contacts 60 and which is advantageously of a type wherein energization of the relay winding or coil 76 effects prompt closure of the contacts 60 and wherein de-energization of the winding 76 serves to open the contacts, but only after a predetermined, controllable time of delay. Various delayed operation devices of this or similar nature are known and may be used in the present combination; hence the drawings show, diagrammatically, the arrangement of one specific device as an example, viz., a so-called "Agastat" time delay relay, type NE-22.

The device 75 has a housing 78 transversely partitioned by a flexible diaphragm 79 which thus closes a pneumatic chamber 80. The diaphragm is urged downwardly by a coil spring 81 under compression and is connected at its other side to the core or armature 82 of the relay winding 76 in such fashion that upon energization of the winding, the armature is moved upwardly, e. g., from the position shown, and acts to displace the center of the diaphragm upward against the spring 81. A ball check valve 84 or the like opens during upward motion of the diaphragm so that such displacement may be relatively rapid. Upon de-energization of the winding 76, the spring 81 urges the diaphragm downwardly, but the movement of the latter is impeded by the air pressure on its under surface except to the extent that air is drawn into the chamber 80 through an adjustable needle valve 86, the check valve 84 remaining closed at this time. In other words, the vacuum created or tending to be created in the chamber 80 delays the downward motion of the diaphragm and the attached armature 82, the time of delay being determined by the opening of the needle valve 86.

The contacts 69 controlled by the armature 82 are preferably of snap-action type or of other structure having lost motion or the like such that upon the described downward movement of the armature, they remain in the closed position which they assumed during the preceding period of energization and are only opened at the end of the armature travel, i. e., thus at the end of the predetermined delay period. Simply for diagrammatic illustration of such function, a lost motion arrangement 88 is indicated as including a head 89 extending from and above the contacts, urged upwardly by a light tension spring 90 (which may be easily overcome by the force of the spring 81 when the latter is unopposed by the magnetic pull of the winding 76), the operating end structure 91 of the armature having opposed operating faces spaced in the direction of its travel as shown, i. e., so that it does not engage and shift the contact member 89 until it reaches an appropriate point in its downward path of travel. Upon the rapid motion of the armature 82 in the other direction (when it is moved upward by energization of the coil 76), the spring 90 or the lower face of the member 91, or both in cooperation, serve to effect a relatively prompt closure of the contacts.

The relay winding 76 is arranged for energization in a circuit 94 which extends to the A. C. lines 63, 64, and includes the switch 70 that is operable by the member 69 at the same time as the switch 67.

It is usually desirable to operate the arcs in a so-called submerged fashion, for example, by providing a heavy layer of fine granular flux on the surface of the work in bridging relationship to the weld path. Such layer of flux is shown at 96 in Fig. 3 and also indicated by the dotted line 96a in Fig. 1. It will be noted that Figs. 1 and 3 also show the cavity 100 believed to travel along the pipe in the course of welding operation, specifically beneath the leading electrode 14; in any event and as explained above, a cavity of this type has ordinarily been found to remain at the end of the welded seam 16 unless the procedure and apparatus of the present invention are used.

It will be understood that at the outset of the welding operation and during its continuance (while the pipe 10 is being advanced), all of the several contacts and switches are closed, e. g., the switches 54, 58, 67, 70 and 73, and likewise the contacts 33 and 41, the windings 62 and 71 being energized when the switches 67 and 73 are closed. Accordingly, arcs are maintained between the electrodes 14, 15, and the work 10 and the welding operation proceeds continuously along the cleft 12. Fig. 2 diagrammatically illustrates the type of weld thus produced at 16 (and likewise the structurally similar, earlier weld 18), whereby a considerable body of weld metal penetrates and is bonded into the wall of the pipe at the cleft edges.

Let it now be assumed that the welding has progressed to the vicinity of the end 19 of the other weld where the present operation is to be arrested, the relative position of the electrodes and work being substantially as shown in Fig. 4. The switch device 68 is now operated, opening both of the switches 67, 70. Opening the switch 67 de-energizes the contactor 34, opening its contacts 33 and interrupting the supply of current both to the arc electrode 14 and its rod feed motor 30. The leading electrode 14 is thus put out of operation, its arc being promptly extinguished. At the same time, opening the switch 70 serves to de-energize the winding 76 of the relay 75. The core or armature of the latter thereupon drops slowly as explained above, and opens the contacts 60, but only after the predetermined delay period, for example, two seconds. Meanwhile, the continuing motion of the pipe 10 has advanced the latter so that the cavity portion 100 previously beneath the electrode 14 is now reached by the second (A. C.) electrode 15 as shown in Fig. 5.

Since the rod feed motor 31 now stops upon the opening of the contacts 60 (the delay period of the relay having been appropriately chosen to accord with the rate of advance of the pipe), no further advance of the electrode rod 15 occurs. The arc, however, continues to burn, and metal continues to be deposited in the crater 100, although the arc lacks sufficient vigor to blow or displace any of such metal out of the crater. As the deposited metal thus fills up the crater in the manner illustrated in Fig. 6, the end of the rod 15 is burned off until the arc gap is so long that the arc will no longer maintain itself. Thereupon the arc is extinguished of its own accord and the welding operation is complete. As indicated above, the result is an effective filling of the welding cavity, or in any event, avoidance of the objectionable results previously encountered whereby such crater was left on the surface of the work.

For safety and convenience, the contactor 42 should be de-energized when the described operation (including the self-extinguishment of the second arc) is over, i. e., so that the arc circuit of the electrode 15 is positively opened at the contacts 41. While this further step can be performed automatically by suitable means if desired, it is very simply accomplished by opening the manual switch 73 as shown. It will be understood that when the apparatus is to be used for another welding operation (the switches 54 and 58 remaining closed or being reclosed), it is only necessary to restore the switch elements 73 and 68, so as to return their several switch contacts to closed position. The contactors are thus energized, and also the relay winding 76, the latter effecting prompt, undelayed closure of the rod feed contacts 60, so that both arcs step off together at the outset of the new operation.

While in the above example, it was assumed that sufficient electrode material may be deposited from the second electrode 15 into the crater 100 during the time that the driving mechanism 20—24 carries such crater past the electrode, and while such results have been in fact achieved in a presently used process of pipe manufacture, means may also be provided to prolong the time of metal deposition if necessary. Thus in Fig. 7, which in effect only represents certain additions to the structure of Fig. 1 and in which corresponding parts are identically or similarly numbered (many elements being omitted in Fig. 7 since they are fully identical and connected in the same way as those of Fig. 1), a second time delay relay 105 is shown, which is of the same character as the relay 75 and has its winding or coil 106 connected for energization in a circuit 108 that extends to the A. C. lines 63, 64 and includes a switch 110. Conveniently, the switch 110 is actuated by a further member or device 68a which may be an integral extension of the member 68 that serves to operate the switches 67 and 70 for control of the contactor 34 and the relay winding 76 respectively. That is to say, the switch arrangement here operated by the device 68—68a constitutes a triple pole single throw switch for simultaneous manual control of the three related circuits 66, 94 and 108.

The contacts 112 of the relay 105 are connected in the energizing circuit 114 of the motor unit 24 which drives the pipe advancing roller 20, it being understood that if desired, the control of the circuit 114, which may be carrying a heavy current from the source 116, can be effected through an intermediate relay or contactor, not shown, but similar to the devices 34, 42. The contacts 112 of the relay 105, like the contacts 60 of the relay 75, are arranged to be closed promptly when the winding 106 is energized and to be opened upon a predetermined period of delay after the de-energization of the winding. A like snap-action and other lost motion device generally indicated at 118 may be included in the mechanical connection to the contacts 112, similar in structure, function and purpose to the device 88 of Fig. 1.

In operating with the system of Fig. 7 and assuming that it otherwise resembles that of Fig. 1, the relay 105 is adjusted so that it breaks the contacts 112 and arrests the driving of the pipe blank at the time that the electrode rod 15 reaches the cavity 100, or preferably, comes over the center of such cavity. The relay 76 is adjusted for a somewhat longer delay so that the rod feed of the electrode 15 is not interrupted until an appreciable time after the pipe has stopped moving. It will therefore be seen that upon operation of the device of Fig. 7 in the same manner as that of Fig. 1, e. g., by actuating the control element 68, 68a, the D. C. arc operation is first interrupted and then the A. C. arc is caused to deposit sufficient metal in the cavity 100 to fill it. Here the relay 105 arrests the motion of the work when the rod 15 has reached the cavity, but a considerably greater quantity of metal is deposited since the arc 15 burns at a full intensity for a further interval before its final period of operation with the rod feed cut off.

By way of more specific example of operation, the arrangement of Fig. 1 has been found very effective using welding speeds (e. g. speed of pipe travel), for pipe of large diameter, as high as 65 inches per minute and producing a seam which is ¾ inch wide and of about ¼ inch penetration in a pipe wall of $\frac{7}{16}$ inch thickness. Upon delaying the operation of the contacts 60 by a period of about 1 second as adjusted by the valve 86 (the precise value of delay being more particularly determined to accord with the actual speed of the pipe 10), about one and one-half (1½) inches or so of rod metal from the electrode 15 are deposited, this having been found sufficient to insure the production of a completely filled weld, to the desired terminal point such as the region 19. As indicated, a deposit of greater amounts of weld metal may be achieved either by some variation of the factors involved in the operations of Fig. 1, or to a larger extent by adoption of the modification shown in Fig. 7.

While the flux blanket 96a prevents visual observation of the behavior of the arcs, considerable evidence of the phenomena occurring under circumstances such as specifically described above has been obtained by oscillograph recordings of arc voltages and currents and by etched sections of the weld at the stopping locality. Thus when the contacts 33 are opened the voltage and current of the D. C. arc (between the rod 14 and the work) drop to zero almost instantaneously (i. e., in less than 0.02 second). After the feed of the A. C. rod 15 is stopped, the A. C. arc continues for about 0.75 second while its voltage climbs steadily and its current diminishes smoothly to about half its normal value; thereupon the A. C. arc and its current cease abruptly. During this last-mentioned interval, the pipe 10 has advanced about ¾ inch further, relative to the electrode 15.

Not only does the primary delay established by the relay 75 give opportunity for the crater of the first (D. C.) arc to become filled, but it appears that the behavior of the A. C. arc as it dies out also prevents the occurrence of any further or renewed crater. The A. C. arc running alone, but at full current, produces a bead width and penetration depth which are each about half the corresponding dimensions of the weld produced by twin arc operation. The increasing voltage and decreasing current of the A. C. arc after its rod feed stops result in a further tapering off of both bead width and penetration, e. g., to values less than ¼ those for the plural arc run. Hence the A. C. arc may travel (i. e., relatively, by the motion of the pipe 10) beyond the point at which the D. C. arc was stopped; indeed in the specific example described, the A. C. arc presumably does so advance for a fraction of an inch (before it finally dies), with the apparent effect of tapering off the weld and further insuring the absence of any crater or cavity at any place along the welded seam. After the A. C. rod feed has been stopped, about ½ inch or so of it burns off as the arc elongates and goes out. This ½ inch of rod adds to the metal filling the crater.

As was stated, the arrangements of the invention are useful in many other types of welding, such as lap or fillet welds or, for example, in making girth welds between pipe or tank sections of extremely large diameter, viz., operations wherein upon rotation of the work about its axis, the plural-arc welding instrumentality follows a circumferential line, returning to the starting place of the weld and there requiring to be arrested without leaving a crater or cavity. The present procedure and apparatus is well adapted for these and other purposes.

It is to be understood that the invention is not limited to the specific procedure and apparatus herein shown and described, but may be carried out in other ways without departure from its spirit.

I claim:

1. A method of interrupting operation of plural arc welding wherein a series of arc electrode rods are arranged along the weld path and individually fed toward the work while energized to produce arcs, and wherein relative movement along the path is effected between the work and the electrode rods comprising, interrupting energizing of a leading one of said electrode rods at a desired end of the weld path, preventing occurrence of a cavity in the work at said end of the weld path by continuing energization of a subsequent one of said electrode rods at least until after continuation of the aforesaid relative movement has brought said subsequent rod to the locality of the work that was occupied by the aforesaid leading rod when its energization was interrupted, so that metal continues to be deposited from said subsequent rod on the work, and effecting extinguishment of the arc of said second rod while it is in the vicinity of said locality.

2. A method of interrupting operation of plural arc welding wherein a series of arc electrode rods are arranged along the weld path and individually fed toward the work while energized to produce arcs and wherein relative movement along the path is effected between the work and the electrode rods, comprising preventing permanent continuance of a cavity in the work which tends to travel with and under at least the leading one of said rods during said welding operations, by interrupting energization of said first rod while continuing said relative movement between the work and the rods, said interruption tending to leave such cavity in the work at the locality then occupied by said first rod, and depositing metal into said cavity from a subsequent one of said rods by continuing said relative movement to bring said second rod to the aforesaid locality while continuing energization of said subsequent rod, and effecting extinguishment thereafter of the arc of said subsequent rod.

3. A method of interrupting operation of plural arc welding wherein a series of arc electrode rods are arranged along the weld path and individually fed toward the work while energized to produce arcs and wherein relative movement along the path is effected between the work and the electrode rods, comprising interrupting energization and feed of the leading one of said electrode rods, and thereafter while maintaining continued relative movement between the electrode rods and the work, interrupting feed of a second of said electrode rods while continuing energization thereof, said interruption of feed of the second rod being delayed in time relative to the aforesaid interruption of feed and energization of the first rod so that said interruption of feed of the second rod occurs as the latter reaches the locality of the weld path which was adjacent the first rod when its feed and energization were interrupted.

4. A method of interrupting operation of plural arc welding wherein a series of arc electrode rods are arranged along the weld path and individually fed toward the work while energized to produce arcs and wherein relative movement progressively along the path is effected between the work and the electrode rods, and wherein said electrode rods are disposed close enough together lengthwise of said path so that they operate in the same puddle of molten metal along the weld path, comprising interrupting energization of the leading one of said rods at a predetermined locality in the path while continuing said relative movement, such interruption leaving a cavity in the work, and after a time of delay interrupting the feed of a succeeding one of said rods while continuing energization thereof, said delay time being determined so that said feed interruption occurs when the succeeding rod is in the vicinity of said locality, the arc of said second rod decreasing in intensity until it is extinguished by elongation, whereby the cavity left by the first rod becomes filled with metal.

5. A method of interrupting operation of plural arc welding wherein a series of arc electrode rods are arranged along the weld path and individually fed toward the work while energized to produce arcs and wherein relative movement along the path is effected between the work and the electrode rods, comprising interrupting energization of a leading one of said electrode rods and after a time of delay, interrupting feed of an immediately succeeding one of said rods while continuing energization thereof so that an arc is maintained between said second rod and the work until interrupted by elongation of the gap due to deposition of metal from said second rod, relative movement of the work and electrode rods being continued at least until said second rod reaches the locality of the work which was occupied by the first rod when its energization was interrupted, and said delayed time being substantially equal to the time required for the aforesaid relative movement to bring the second rod to the aforesaid locality which had been occupied by the first rod.

6. A method of interrupting operation of plural arc welding wherein a series of arc electrode rods are arranged along the weld path and individually fed toward the work while energized to produce arcs and wherein relative movement along the path is effected between the work and the electrode rods, comprising interrupting feed and energization of the first of said electrode rods, and thereafter interrupting feed of the second of said rods while permitting continuance of energization of said second rod until elongation of its arc gap due to deposition of metal from the rod extinguishes its arc, said interruption of feed of the second rod being delayed at least until the second rod, by said relative movement, reaches the locality of the work which had been occupied by the first rod when its feed and energization were interrupted.

7. A method as described in claim 6 wherein the relative movement between the work and the rods is maintained at least until extinguishment of the arc of the second rod, and wherein the aforesaid delay of interruption of feed of the second rod is timed with said relative movement so that said rod feed interruption occurs substantially as the second rod first reaches the aforesaid locality of the work occupied by the first rod when its feed and energization were interrupted.

8. A method as described in claim 6 which includes interrupting said relative movement of the work and the electrode rods substantially as the second rod reaches the aforesaid locality occupied by the first rod when its feed and energization were interrupted, and in which the interruption of feed of the second rod is delayed until a time after said interruption of relative movement, to provide substantially greater deposition of metal into the work by operation of the arc of said second rod than would be possible if the feed of the second rod were interrupted as soon as it reached said locality.

9. A method of interrupting operation of plural arc welding wherein a series of arc electrode rods are arranged along the weld path and individually fed toward the work while energized to produce arcs and wherein relative movement along the path is effected between the work and the electrode rods, comprising preventing permanent continuance of a cavity in the work which travels with and under the arc of a leading one of said rods during said welding operation, by interrupting energization of said first rod while continuing said relative movement between the work and the rods, said interruption leaving such cavity in the work at the locality then occupied by said first rod, and filling said cavity by deposition of metal from a second one of said rods by continuing said relative movement to bring said second rod to the locality of said cavity and interrupting feed of said second rod while continuing energization thereof to effectuate said deposition of metal until elongation of the arc gap of said second rod occasioned by said deposition extinguishes the arc of said second rod.

10. Control apparatus for arc welding means which includes a series of electrode rods arranged along the weld path of the work and means for effecting relative movement between the work and the rods progressively along the weld path, each electrode rod having rod feeding means and energizing means, comprising a control device for controlling the rod feed and energization means of the first of said electrode rods to interrupt operation thereof, means including a time-delay device, for controlling the rod feed means of a second of said electrode rods, to interrupt feed of said second rod at a predetermined time after operation of said first mentioned control device, and common control means for simultaneously actuating said control device and said time delay device, to effect immediate interruption of the energization of the first rod and interruption of the rod feed of the second rod at the predetermined time thereafter, said time-delay device being set so that said predetermined time is correlated with the movement between the work and the rods, to interrupt the rod feed of the second rod after it has reached the locality of the work which the first rod occupied when its energization was interrupted.

11. Control apparatus for arc welding means which includes a series of electrode rods arranged along the weld path of the work and means for effecting relative movement between the work and the rods progressively along the weld path, each electrode rod having rod feeding means and energizing means, comprising control means for the energization means of a leading one of said electrode rods, operable to interrupt energization of said first rod, and means timed with said control means and operating upon a predetermined delay after operation of said control means, for controlling the feed means of a subsequent one of said rods, to interrupt the feed of said second rod, said control means and said means timed therewith having common operating means for simultaneous actuation of both said first-mentioned means, to effect immediate interruption of the energization of the first rod and interruption of the feed of said second rod upon the predetermined delay thereafter, said delayed operating means being set so that said predetermined delay is correlated with the movement between the work and the rods, to interrupt the rod feed of the second rod after it has reached the locality of the work which the first rod occupied when its energization was interrupted.

12. Control apparatus for arc welding means which includes a series of electrode rods arranged along the weld path of the work, each electrode rod having rod feeding means and energizing means, comprising circuit controlling means for the energizing means for the first of said rods, operable to interrupt energization thereof, circuit controlling means for the rod feed means of a subsequent one of said rods, operable to interrupt feed of said second rod, a time-delay device adapted to control said second circuit controlling means and having a means for bringing said device into play upon operation of the first circuit controlling means, for operating the second circuit controlling means to interrupt the feed of the second rod only after a predetermined time following the interruption of energization of the first rod, and a control device for the first circuit controlling means, said means for bringing the time-delay device into operation comprising a control circuit for the time-delay device and circuit controlling means therein operated by the aforesaid control device.

13. Control apparatus for arc welding means which includes a series of electrode rods arranged along the weld path of the work, each electrode rod having rod feeding means and energizing means, comprising circuit controlling means for the energizing means for the first of said rods, operable to interrupt energization thereof, circuit controlling means for the rod feed means of a subsequent one of said rods, operable to interrupt feed of said second rod, a time-delay device adapted to control said second circuit controlling means and having a means for bringing said deviec into play upon operation of the first circuit controlling means, for operating the second circuit controlling means to interrupt the feed of the second rod only after a predetermined time following the interruption of energization of the first rod, the aforesaid time-delay device comprising an electro-magnetic relay, said second circuit controlling means comprising contacts, normally closed during energization of said relay, for electrical control of the rod feed means of the second rod, said electromagnetic relay including said contacts operable thereby and being adapted to open said contacts only upon delay of said predetermined time after deenergization of said relay, and the means for bringing said time-delay device into play comprising an energizing circuit for the relay and circuit controlling means operable with the first mentioned circuit controlling means to open said relay-energizing circuit.

14. In apparatus for plural arc welding, in combination, a pair of arc electrode rods arranged in series to weld along a predetermined path of the work to be welded, so that the welding progresses along said path upon relative motion between the work and the electrode rods, each of said electrode rods having an energizing circuit therefor and each of said rods having rod feed means including an electrical control circuit normally closed to maintain operation of the corresponding rod feed means, switch means for the energizing and rod feed control circuits of the first of said rods, operable to interrupt the energization and feed of said first rod, a time delay relay having contacts in the rod feed circuit of the second electrode rod, said contacts being closed when said relay is energized and said relay being adapted to effect opening of said contacts upon a determined time of delay after deenergization of the relay, an energizing circuit for the relay, having switch means operable to open said circuit, and common means for simultaneously operating both said first and last mentioned switch means.

15. In apparatus for plural arc welding, in combination, a pair of arc electrode rods arranged in series to weld along a predetermined path of the work to be welded, so that the welding progresses along said path upon relative motion between the work and the electrode rods, each of said electrode rods having an energizing circuit therefor and each of said rods having rod feed means including an electrical control circuit normally closed to maintain operation of the corresponding rod feed means, circuit controlling means for the energizing and rod feed control circuits of the first of said rods, to interrupt the energization and feed thereof upon operation of said circuit controlling means, circuit controlling means for the energizing circuit for the second of said rods, said second circuit controlling means being normally closed to maintain energization thereof, circuit controlling means for the rod feed control circuit of the second rod, said third circuit controlling means being normally closed to maintain feed of said rod, and time-delay means controlled by the first mentioned circuit controlling means for operating the third circuit controlling means to interrupt the feed of said second rod at a predetermined time of delay after said first mentioned circuit controlling means has been operated to interrupt feed and energization of the first rod.

16. Apparatus as described in claim 15 wherein said time-delay means comprises a normally energized relay, said third circuit controlling means comprising contacts actuated by said relay to be maintained closed during energization thereof, said relay having an energizing circuit therefor and normally closed control contacts in said circuit, said contacts being embodied in said first aforesaid circuit controlling means and being adapted to be opened upon the aforesaid operation of the latter which interrupts energization and feed of the first of the electrode rods.

17. Apparatus as described in claim 15 which includes driving means for effecting the aforesaid relative motion between the work and the electrode rods in the direction of the weld path, and which includes time-delay means controlled by said first mentioned circuit controlling means, for controlling said driving means, to interrupt operation thereof upon a predetermined time of delay after said first circuit controlling means has been operated to interrupt feed and energization of the first electrode rod.

18. Control apparatus for arc welding means which includes a series of electrode rods arranged along the weld path of the work, each electrode rod having rod feeding means and energizing means, and which includes driving means for effecting relative movement between the work and said rods along said path, comprising control means for the energization means of a leading one of said electrode rods, operable to interrupt energization of said first rod, means timed with said control means and operating upon a predetermined delay after operation of said control means, for controlling said driving means, to interrupt said relative movement, and means timed with said first mentioned control means and operating upon a predetermined longer delay after operation of said first mentioned control means, for controlling the feed means of a subsequent one of said rods, to interrupt the feed of said second rod.

19. A method of interrupting operation of plural arc welding wherein a series of electrically energized arc electrodes are arranged along the weld path in mutually spaced relation but close enough together so that they operate in the same puddle of molten metal along the weld path, and wherein relative movement progressively along the path is effected between the work and the electrodes, comprising interrupting operation of the electrodes in sequence, the operation of the leading electrode being interrupted when it has reached a desired end locality for the weld path, said interruption of the leading electrode tending to leave a crater in the work at said locality, interruption of operation of each subsequent electrode being delayed after interruption of operation of the preceding electrode while said relative movement is continued to bring the said subsequent electrode to said end locality where the operation of the leading electrode was interrupted, and the interruption of operation of each subsequent electrode being effected in the vicinity of said locality and by discontinuing feed of the electrode toward the work while continuing energization of such electrode for a short period, so as to promote filling of said crater with weld metal.

WALTER S. SCHAEFER.

REFERENCES CITED

The following references are of record in the file of this patent:

UNITED STATES PATENTS

| Number | Name | Date |
|---|---|---|
| 1,340,056 | Kenyon | May 11, 1920 |
| 1,549,450 | Clarkson | Aug. 11, 1925 |
| 1,701,372 | Jefts | Feb. 5, 1929 |
| 2,152,785 | Blankenbuehler | Apr. 4, 1939 |
| 2,289,979 | Mann | July 14, 1942 |
| 2,436,387 | Harter et al. | Feb. 24, 1948 |